(12) United States Patent
Ma et al.

(10) Patent No.: US 11,651,583 B2
(45) Date of Patent: May 16, 2023

(54) MULTI-CHANNEL OBJECT MATCHING

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/811,504

(22) Filed: Jul. 8, 2022

(65) Prior Publication Data

US 2023/0011829 A1   Jan. 12, 2023

Related U.S. Application Data

(60) Provisional application No. 63/366,738, filed on Jun. 21, 2022, provisional application No. 63/220,886, filed on Jul. 12, 2021, provisional application No. 63/219,731, filed on Jul. 8, 2021, provisional application No. 63/219,729, filed on Jul. 8, 2021.

(51) Int. Cl.
| | | |
|---|---|---|
| *G06V 10/75* | (2022.01) | |
| *G06V 20/70* | (2022.01) | |
| *G06V 10/80* | (2022.01) | |
| *G06T 7/277* | (2017.01) | |

(Continued)

(52) U.S. Cl.
CPC .......... *G06V 10/759* (2022.01); *G06T 7/277* (2017.01); *G06V 10/80* (2022.01); *G06V 10/82* (2022.01); *G06V 20/56* (2022.01); *G06V 20/70* (2022.01); *G06T 2207/10028* (2013.01); *G06T 2207/10044* (2013.01); *G06T 2207/30252* (2013.01)

(58) Field of Classification Search
CPC ...... G06V 10/759; G06V 20/70; G06V 10/82; G06V 10/80; G06V 20/56; G06T 7/277
See application file for complete search history.

(56) References Cited

U.S. PATENT DOCUMENTS 10,408,939 B1 * 9/2019 Kim ..................... G01S 17/931
11,061,406 B2 * 7/2021 Mao ................. B60W 30/0956
(Continued)

OTHER PUBLICATIONS

Feng, Di, et al. "Deep multi-modal object detection and semantic segmentation for autonomous driving: Datasets, methods, and challenges." IEEE Transactions on Intelligent Transportation Systems 22.3 (2020): 1341-1360. (Year: 2020).*
(Continued)

*Primary Examiner* — Utpal D Shah
(74) *Attorney, Agent, or Firm* — Maschoff Brennan (57) ABSTRACT

A method may include obtaining first sensor data captured by a first sensor system and second sensor data captured by a second sensor system of a different type from the first sensor system. The method may include detecting a first object included in the first sensor data and a second object included in the second sensor data. The method may include assigning a first label to the first object and a second label to the second object after comparing the first and the second sensor data. The first and second labels may indicate degrees to which the first and the second objects match. Responsive to the first and second labels indicating that the first and the second objects match, the method may include designating a matched object representative of the first object and the second object and sending the matched object to a downstream computing system of an autonomous vehicle.

17 Claims, 6 Drawing Sheets

(51) Int. Cl.
  *G06V 20/56* (2022.01)
  *G06V 10/82* (2022.01)

(56) References Cited

U.S. PATENT DOCUMENTS

| | | | |
|---|---|---|---|
| D963,671 S * | 9/2022 | Jiang | D14/485 |
| 2015/0310281 A1 | 10/2015 | Zhu et al. | |
| 2019/0353784 A1 | 11/2019 | Toledano et al. | |
| 2020/0250514 A1* | 8/2020 | Kim | G06K 9/6256 |
| 2022/0027675 A1* | 1/2022 | Sheu | G01S 17/894 |
| 2022/0027684 A1* | 1/2022 | Sheu | G01S 17/931 |
| 2022/0111864 A1* | 4/2022 | Jarquin Arroyo | B60W 60/001 |
| 2022/0164609 A1* | 5/2022 | Lee | G06K 9/628 |
| 2022/0242453 A1* | 8/2022 | Hahn | G06N 20/00 |

OTHER PUBLICATIONS

Dai et al., Learning to Localize Detected Objects, 2012 IEEE Conference on Computer Vision and Pattern Recognition, 2012, pp. 3322-3329.

Zhao et al., Fusion of 3D LIDAR and Camera Data for Object Detection in Autonomous Vehicle Applications, IEEE Sensors Journal, 20(9), 2020, pp. 4901-4913.

PCT International Search Report and Written Opinion issued in corresponding application No. PCT/US2022/036592, dated Oct. 17, 2022.

* cited by examiner

MULTI-CHANNEL OBJECT MATCHING

CROSS-REFERENCES TO RELATED APPLICATIONS

This application claims the benefit of U.S. Patent Application Ser. No. 63/219,729, filed on Jul. 8, 2021, U.S. Patent Application Ser. No. 63/219,731, filed on Jul. 8, 2021, U.S. Patent Application Ser. No. 63/220,886, filed on Jul. 12, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of multi-channel object matching.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining first sensor data captured by a first sensor system and second sensor data captured by a second sensor system of a different type from the first sensor system. The method may include detecting a first object included in the first sensor data and a second object included in the second sensor data. The method may include assigning a first label to the first object and a second label to the second object after comparing the first and the second sensor data. The first and second labels may indicate degrees to which the first and the second objects match. Responsive to the first and second labels indicating that the first and the second objects match, the method may include designating a matched object representative of the first object and the second object and sending the matched object to a downstream computing system of an autonomous vehicle.

In some embodiments, the first sensor system may be a Light Detection and Ranging (LiDAR) sensor system.

In some embodiments, the second sensor system may be a camera sensor system or a radar sensor system.

In some embodiments, detecting the first object included in the first sensor data and detecting the second object included in the second sensor data may include applying a region-based convolutional neural network to the first sensor data and the second sensor data.

In some embodiments, comparing the first sensor data and the second sensor data to indicate the degree to which the first object and the second object match may include applying a Hungarian matching algorithm to the first sensor data corresponding to the first object and the second sensor data corresponding to the second object.

In some embodiments, the method may further include obtaining third sensor data that includes a third object that does not match the first object or the second object. A Kalman filtering process may be applied to the third sensor data in which the Kalman filtering process includes matching a third motion parameter associated with the third object to one or more first motion parameters associated with the first object or one or more second motion parameters associated with the second object. The method may further include determining that the third object matches the first object or the second object based on the matching of the third motion parameter to the first motion parameters or the second motion parameters.

In some embodiments, determining the matched object based on the first object and the second object may include using a probabilistic shape fusion process, a statistical-method-based fusion process, or a statistical-method-based existence fusion process to match an identity of the first object to an identity of the second object.

According to an aspect of an embodiment, one or more non-transitory computer-readable storage media configured to store instructions that, in response to being executed, cause a system to perform operations. The operations may include obtaining first sensor data captured by a first sensor system and second sensor data captured by a second sensor system of a different type from the first sensor system. The method may include detecting a first object included in the first sensor data and a second object included in the second sensor data. The method may include assigning a first label to the first object and a second label to the second object after comparing the first and the second sensor data. The first and second labels may indicate degrees to which the first and the second objects match. Responsive to the first and second labels indicating that the first and the second objects match, the method may include designating a matched object representative of the first object and the second object and sending the matched object to a downstream computing system of an autonomous vehicle.

In some embodiments, the first sensor system may be a Light Detection and Ranging (LiDAR) sensor system.

In some embodiments, the second sensor system may be a camera sensor system or a radar sensor system.

In some embodiments, detecting the first object included in the first sensor data and detecting the second object included in the second sensor data may include applying a region-based convolutional neural network to the first sensor data and the second sensor data.

In some embodiments, comparing the first sensor data and the second sensor data to indicate the degree to which the first object and the second object match may include applying a Hungarian matching algorithm to the first sensor data corresponding to the first object and the second sensor data corresponding to the second object.

In some embodiments, the operations may further include obtaining third sensor data that includes a third object that does not match the first object or the second object. A Kalman filtering process may be applied to the third sensor data in which the Kalman filtering process includes matching a third motion parameter associated with the third object to one or more first motion parameters associated with the first object or one or more second motion parameters associated with the second object. The operations may further include determining that the third object matches the first object or the second object based on the matching of the third motion parameter to the first motion parameters or the second motion parameters.

In some embodiments, determining the matched object based on the first object and the second object may include using a probabilistic shape fusion process, a statistical-method-based fusion process, or a statistical-method-based existence fusion process to match an identity of the first object to an identity of the second object.

According to an aspect of am embodiment, a system may include one or more processors and one or more non-transitory computer-readable storage media configured to store instructions that, in response to being executed, cause a system to perform operations. The operations may include obtaining first sensor data captured by a first sensor system and second sensor data captured by a second sensor system of a different type from the first sensor system. The method may include detecting a first object included in the first sensor data and a second object included in the second sensor data. The method may include assigning a first label to the first object and a second label to the second object after comparing the first and the second sensor data. The first and second labels may indicate degrees to which the first and the second objects match. Responsive to the first and second labels indicating that the first and the second objects match, the method may include designating a matched object representative of the first object and the second object and sending the matched object to a downstream computing system of an autonomous vehicle.

In some embodiments, the first sensor system may be a Light Detection and Ranging (LiDAR) sensor system.

In some embodiments, the second sensor system may be a camera sensor system or a radar sensor system.

In some embodiments, detecting the first object included in the first sensor data and detecting the second object included in the second sensor data may include applying a region-based convolutional neural network to the first sensor data and the second sensor data.

In some embodiments, comparing the first sensor data and the second sensor data to indicate the degree to which the first object and the second object match may include applying a Hungarian matching algorithm to the first sensor data corresponding to the first object and the second sensor data corresponding to the second object.

In some embodiments, the operations may further include obtaining third sensor data that includes a third object that does not match the first object or the second object. A Kalman filtering process may be applied to the third sensor data in which the Kalman filtering process includes matching a third motion parameter associated with the third object to one or more first motion parameters associated with the first object or one or more second motion parameters associated with the second object. The operations may further include determining that the third object matches the first object or the second object based on the matching of the third motion parameter to the first motion parameters or the second motion parameters.

In some embodiments, determining the matched object based on the first object and the second object may include using a probabilistic shape fusion process, a statistical-method-based fusion process, or a statistical-method-based existence fusion process to match an identity of the first object to an identity of the second object.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The present disclosure relates to object matching between different types of sensor data, such as raw pointclouds of LiDAR data, image data, radar data, etc., captured from two or more sensor channels. Individual sensor channels may include various advantages and disadvantages and the fusion of sensor data from multiple sensor channels may improve the flexibility and/or adaptability of the perception system by compensating for the disadvantages of any given individual sensor channel, for example, by utilizing the strengths of other types of sensor channels. For example, image-capturing sensors and data channels may capture image data that includes numerous recognizable objects that facilitate object-identification processes. However, determining physical parameters (e.g., position, velocity, and/or acceleration) associated with the objects included in the image data may be more challenging relative to determining such physical parameters associated with the same objects represented by a raw pointcloud of LiDAR data. By fusing multiple sensor channels based on matching objects captured by each of the sensor channels, the computing speed and/or accuracy of object-perception systems for autonomous vehicles may be improved.

Embodiments of the present disclosure will be explained with reference to the accompanying drawings.

Figure 1:
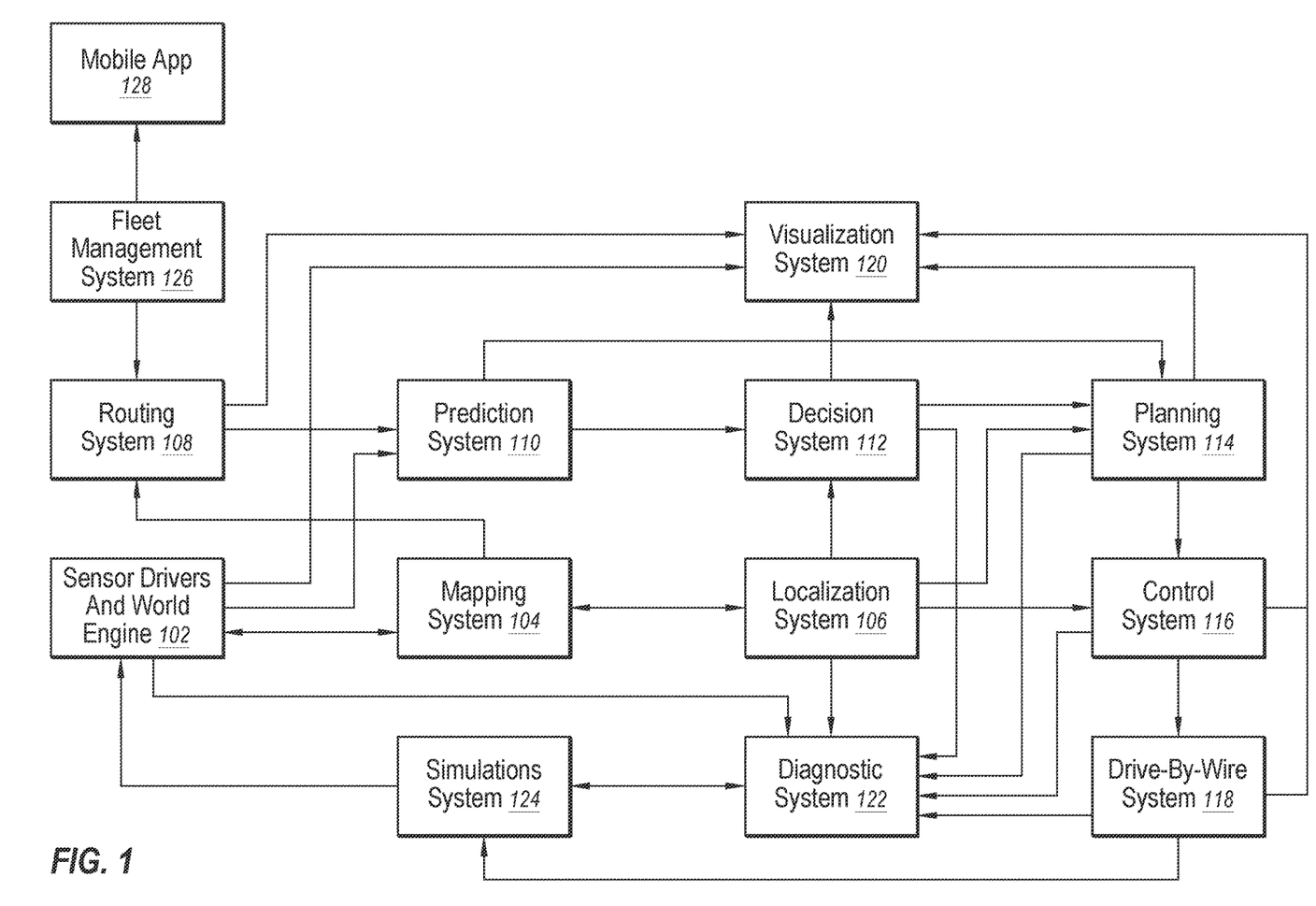
FIG. 1 illustrates an example embodiment of an autonomous driving system according to at least one embodiment of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2A:
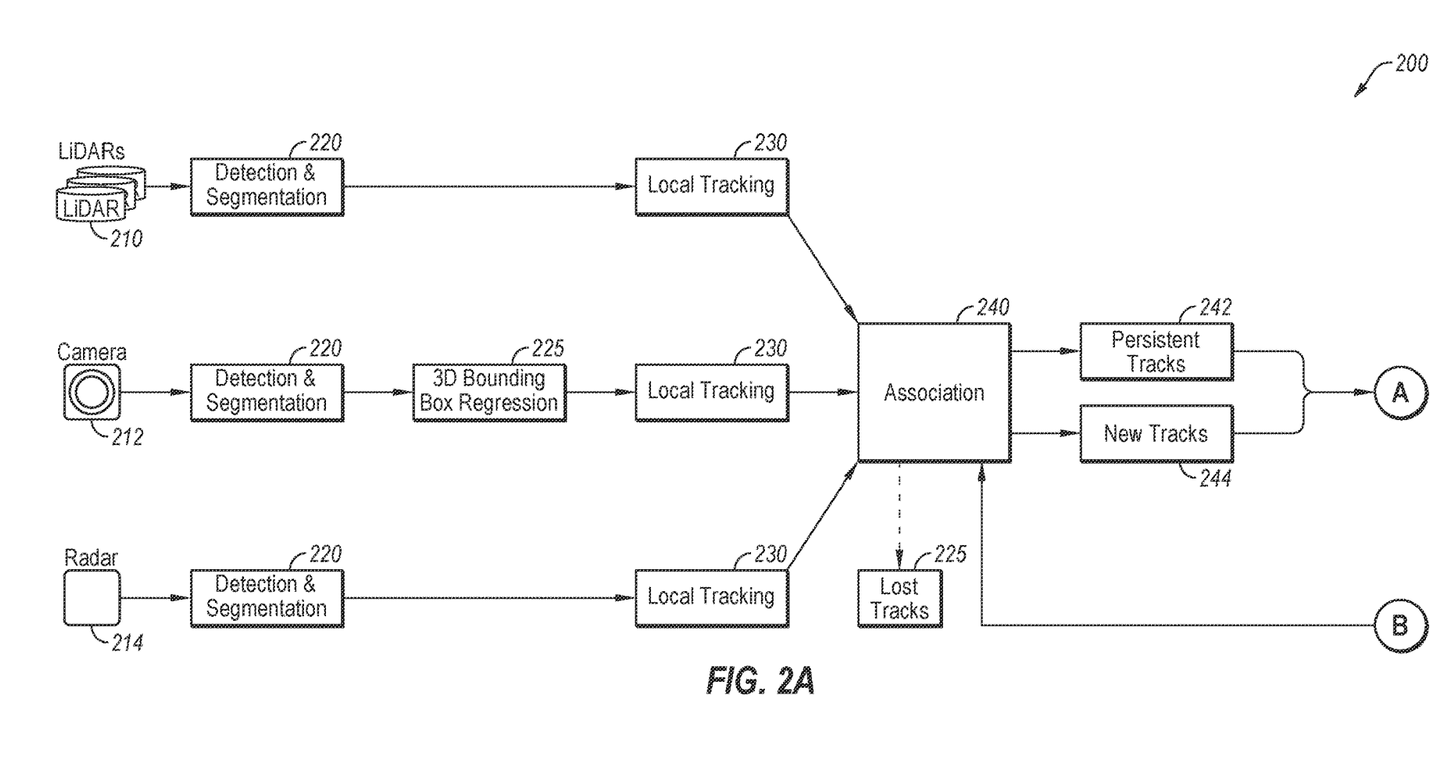
FIGS. 2A and 2B, which may be referred to collectively as FIG. 2, illustrate a dynamic flow of an object-matching system according to the present disclosure.
Figure 2B:
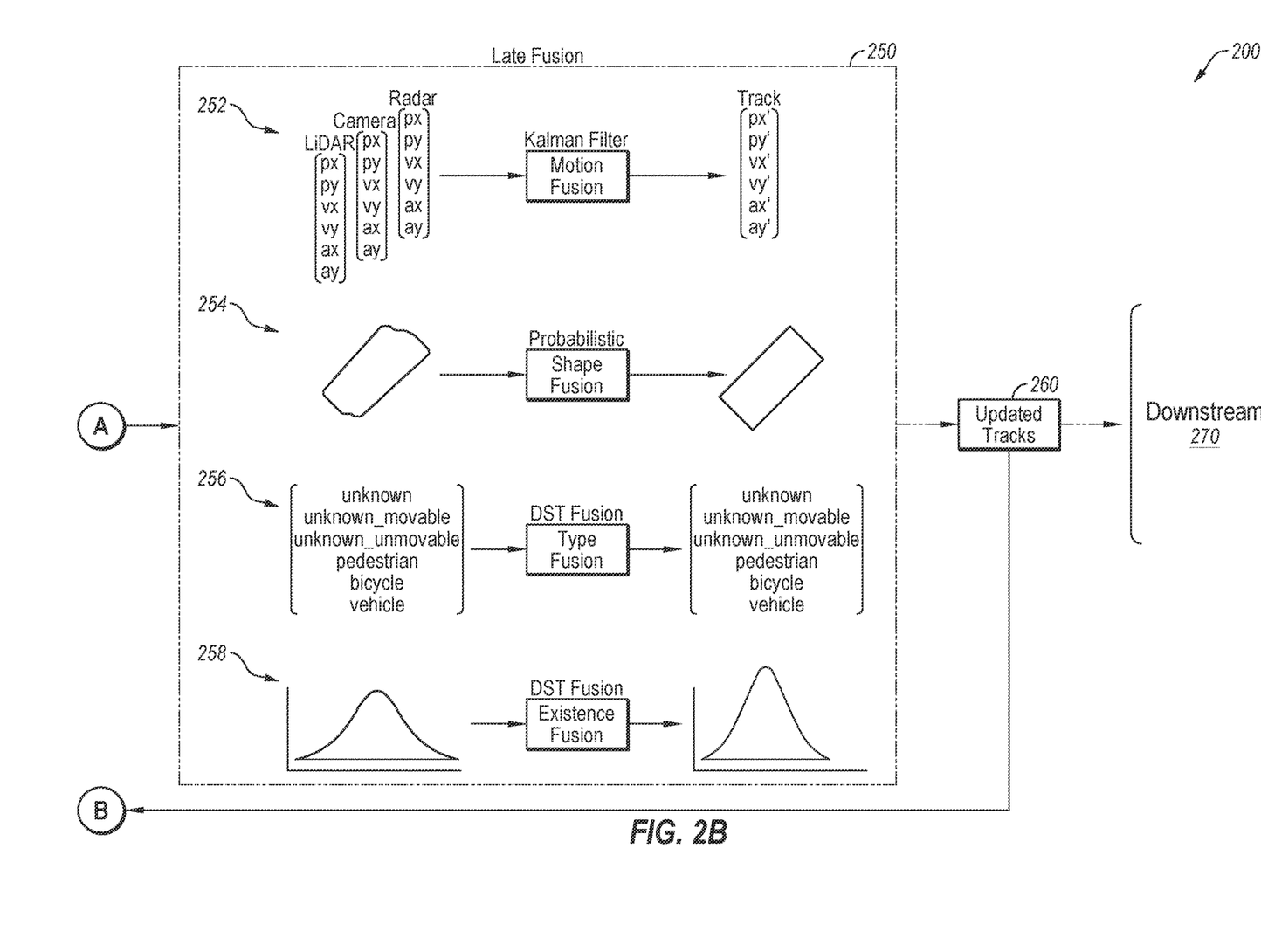

FIG. 2 illustrates a dynamic flow of an object-matching system 200 according to the present disclosure. The object-matching system 200 may obtain sensor data from one or more sensor channels. For example, the object-matching system 200 may obtain raw pointcloud LiDAR data from one or more LiDAR sensors 210, image data from one or more camera sensors 212, radar data from one or more radar sensors 214, and/or some combination thereof. While LiDAR 210, camera sensors 212, and radar sensors 214 are illustrated, any other number of sensors with associated data are contemplated within the present disclosure.

In some embodiments, the object-matching system 200 may perform one or more object-detection operations for the sensor data obtained from each of the sensor channels. The object-detection operations may be tailored to the sensor channel from which the sensor data is obtained because different sensor channels obtain different types of sensor data. For example, the raw pointclouds captured by the LiDAR sensors 210 and/or the radar data captured by the radar sensors 214 may include three-dimensional representations of objects included in an environment, and the image data captured by the camera sensors 212 may include two-dimensional representations of objects included in the environment. As such, the object-detection operations related to the three-dimensional raw pointclouds and/or the radar data may be analyzed via a detection and segmentation module 220 applying a machine learning process, such as region-based convolutional neural network ("R-CNN") or other CNN process to detect one or more objects included in the raw pointclouds and/or the radar data. Additionally or alternatively, object detection and/or data segmentation of the two-dimensional image data may be facilitated by a three-dimensional bounding box regression module 225, an image object detection process, an image segmentation process, any other image analysis process, and/or some combination thereof.

In some embodiments, the sensor data from each of the sensor channels may be organized as one or more chronological frames of data, and one or more parameters of the detected objects included in the sensor data may be determined for one or more of the frames by a local tracking module 230. The local tracking module may be configured to track the detected objects across two or more frames based on the determined parameters of the detected objects. For example, each of the detected objects may be assigned a tracking identifier, and parameters such as a position, an orientation, a velocity, and/or an acceleration of the detected objects may be calculated based on changes to the detected objects over two or more frames.

Initial matching of a first detected object and a second detected object may include comparing the determined parameters corresponding to the first detected object with the determined parameters corresponding to the second detected object. In some embodiments, a Hungarian matching algorithm 240 (e.g., a Gated Hungarian Matcher) may be used to facilitate the comparison between the determined parameters of the first detected object and the determined parameters of the second detected object. One or more features used as inputs for the Hungarian matching algorithm 240 may be calculated based on the determined parameters corresponding to each of the detected objects. For example, a size of a given detected object may be determined based on a two-dimensional bounding box size and/or a three-dimensional bounding box size projected into two dimensions associated with the given detected object. A trajectory of the given detected object may be calculated based on a trajectory of the object projected into two dimensions. For example, a given trajectory calculation may involve determining a center point and/or a centroid of the given detected object in which the center point of the given detected object may be determined based on a center point of the bounding box associated with the given detected object, and a centroid of the given detected object may be determined based on a centroid of the three-dimensional data corresponding to the given detected object. Different frames that include the given detected object may be captured at a known rate (e.g., 5 frames per second, 10 frames per second, 20 frames per second, or any other frame capture rate). Based on the known frame capture rate and the given detected object moving a given distance between two or more frames, a trajectory, a velocity, and/or other parameters associated with the given detected object may be calculated.

Based on the results of the initial matching, the matched object may be assigned a label. The label may classify the matched object based on a degree of similarity between the parameters of the two or more detected objects from which the matched object was identified in the data from the various sensors. In some embodiments, the matched object may be categorized as part of a persistent track 242, a new track 244, or a lost track 246. The matched object may be categorized as part of the persistent track 242 in situations in which the parameters of at least two of the two or more detected objects that the matched object is based on are the same or similar within a given threshold. Additionally or alternatively, a persistent-track object may be an object identified in all available sensor data (e.g., the radar data, the raw pointcloud, and the image data). As such, the persistent-track label may describe matched objects for which there are few, if any, discrepancies between the sensor data captured by each of the sensor channels. In some embodiments, an object may be categorized as part of the lost track 246 in situations in which the object is only detected by one sensor channel of the multiple sensor channels. Additionally or alternatively, the object may be classified as a lost-track object in situations in which the object is not detected by every sensor channel. In some embodiments, the objects categorized as part of the lost track 246 may be excluded from further data processing by the object-matching system 200.

In some embodiments, the matched object may be categorized as part of the new track 244 in situations in which some discrepancies exist between the parameters associated with a first detected object and parameters associated with a second detected object on which the matched object is based. Sensor data captured by a first sensor channel may be identified as including a more accurate representation of objects than sensor data captured by other sensor channels. For example, a given camera sensor system may be identified as providing more refined sensor data than a given LiDAR sensor system because the given camera sensor system includes high quality sensors, is well-calibrated, or for any other reason. The given camera sensor system may detect an object that includes different parameters than the same object as detected by the given LiDAR sensor system. The object detected by the given camera sensor system may be categorized as part of the new track 244, and the same object as detected by the given LiDAR sensor system may also be categorized as part of the new track 244 because image data captured by the given camera sensor system is more reliable than raw pointclouds captured by the given LiDAR sensor system. As another example, a given LiDAR sensor system may be identified as providing more refined sensor data than a given camera sensor system. As such, objects detected in the raw pointclouds captured by the given LiDAR sensor system may be categorized as part of the new track 244. In these and other examples, disagreements between the object detected by the given camera sensor system and the same object as detected by the given LiDAR sensor system may be resolved via data processing during a late-fusion process 250.

Additionally or alternatively, particular sensor systems may be more reliable and provide more trustworthy sensor data with respect to certain parameters and/or properties relating to the objects. The sensor data provided by the particular sensor systems that are the most reliable may be categorized as part of the new track 244. For example, a LiDAR sensor system may be treated as providing better information relating to distance between the LiDAR sensor system and a given object, while a camera sensor system may be treated as providing better information relating to color and/or resolution of captured image data. In this and other examples, objects identified in the LiDAR data may be categorized as part of the new track 244 in situations in which the distance and spatial relations between the LiDAR sensors and the objects in the total measurable world are important for object detection purposes (e.g., in dark environments or other environments in which distances between objects and/or the LiDAR sensors is important for autonomous operations), while objects identified in the image data may be categorized as part of the new track 244 in situations in which the color and/or the resolution of the objects in the total measurable world are important for object detection purposes (e.g., in environments that include many similar colors).

In some embodiments, the object-matching system 200 may include a late-fusion process 250, which may verify the identity of the matched objects and improve the accuracy of the object-matching system 200. The late-fusion process 250 may determine one or more updated tracks 260 based on the persistent tracks 242 and the new tracks 244 in which the updated tracks 260 include more accurate parameters and/or classifications of the detected objects than objects included in either the persistent tracks 242 or the new tracks 244.

In some embodiments, the late-fusion process 250 may include using one or more data-processing operations to facilitate verification of existing parameters and/or calculation of additional parameters of the detected object. For example, a Kalman filtering process 252 may be applied to the parameters associated with a position, a velocity, an acceleration, and/or an orientation of the detected objects included in the persistent tracks 242 and/or the new tracks 244 to determine an updated track 260 that includes motion-matched parameters.

As another example, probabilistic shape fusion 254 may be performed to verify a shape of the detected objects (e.g., by predicting a most likely shape selected from the potential shapes of the various sensor data, or predicting a most likely shape based on the potential shapes of the various sensor data even if not one of the shapes specifically depicted by the various sensor data).

As another example, a statistical-method-based fusion 256 may be performed on the sensor data. Performing statistical-method-based fusion 256 may facilitate label fusion and/or existence fusion of the detected objects and distinguish similar objects from one another (e.g., distinguishing between a bicycle object and a motorcycle object, distinguishing between a pedestrian object and a traffic cone object, etc.). For example, if one sensor datum relates to a first prediction that an object is a bicycle and another datum relates to a second prediction that the object is a motorcycle, the statistical-method-based type fusion 256 may resolve the disagreement. In some embodiments, the statistical-method-based fusion 256 may involve predicting whether a given detected object is likely to represent a specific object out of two or more possible options regarding the identity of the object because the properties associated with the given detected object may be relatable to two or more possible object identities. Returning to the previous example, a given object may be predicted to be either a bicycle or a motorcycle because both vehicles are bi-wheel vehicles, and the sensor data may indicate that the given object includes two wheels and has a general profile similar to that of a bicycle or a motorcycle. However, the given object may be detected on a highway road system. In this and other examples, the statistical-method-based fusion 256 may predict that the given object is more likely to be a motorcycle because bicycles are unlikely to be present on the highway road system. In these and other embodiments, the statistical-method-based fusion 256 may make probabilistic identifications of objects based on a provided dataset. Additionally or alternatively, the statistical-method-based fusion 256 may be informed by object detections and/or identifications from sensor data captured over a recent period of time (e.g., sensor data captured over the past year, the past ten months, the past six months, the past two months, the past month, the past three weeks, the past week, the past day, or any other period of time).

In these and other embodiments, a statistical-method-based existence fusion 258 may be applied to the objects to confirm whether a given object exists based on the obtained sensor data. For example, if a first sensor datum relates to a prediction that the presence/existence of an object and a second sensor datum relates to a prediction that the object does not exist, the statistical-method-based existence fusion 258 may probabilistically resolve the discrepancy between the first sensor datum and the second sensor datum.

In these and other embodiments, the object-matching system 200 may repeat the initial object-matching process including one or more operations performed by the local tracking module 230 and/or the Hungarian matching algorithm 240 and/or the late-fusion process 250 to further analyze previously inconclusive sensor data from the initial object-matching process and/or update the detected objects based on newly obtained and/or processed sensor data. The operations of the local tracking module 230, the Hungarian matching algorithm 240, and/or the late-fusion process 250 may be repeated a threshold number of iterations, until one or more iteration criteria are satisfied, or until any other iteration conditions are met, and the updated tracks 260 may be sent downstream to one or more computing systems 270 associated with an autonomous vehicle for further data processing, application, etc.

Modifications, additions, or omissions may be made to the object-matching system 200 without departing from the scope of the present disclosure. For example, the designations of different elements in the manner described is meant to help explain concepts described herein and is not limiting. For instance, in some embodiments, the local tracking module 230, the Hungarian matching algorithm 240, and/or the late-fusion process 250 are delineated in the specific manner described to help with explaining concepts described herein but such delineation is not meant to be limiting. Further, the object-matching system may include any number of other elements or may be implemented within other systems or contexts than those described.

Figure 3:
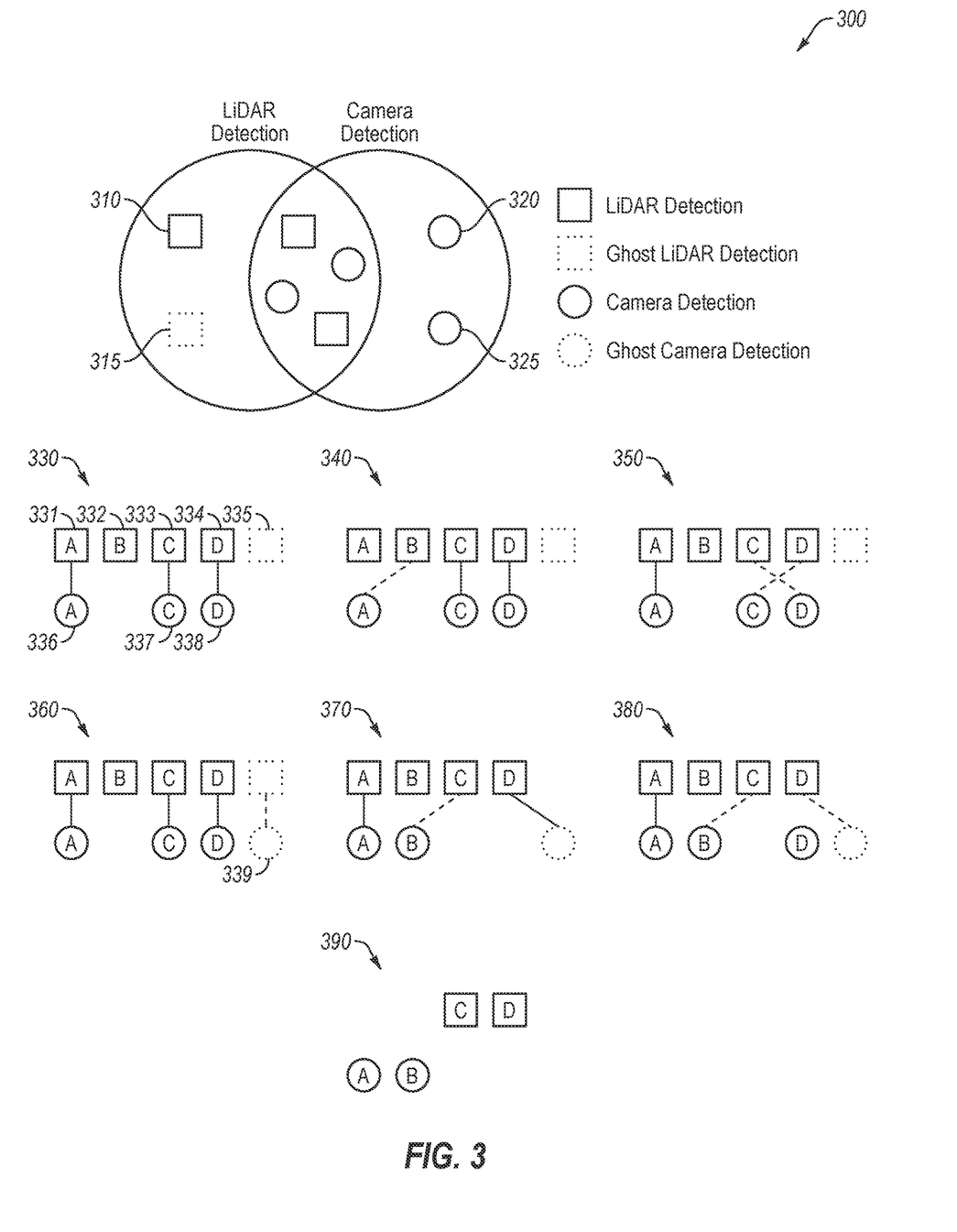
FIG. 3 is a diagram illustrating various examples of an initial object-matching process based on LiDAR data and image data according to the present disclosure.

FIG. 3 is a diagram illustrating various examples of an initial object-matching process 300 based on LiDAR data and image data according to the present disclosure. For example, FIG. 3 may provide an example of the results of the Hungarian matching algorithm 240 of FIG. 2. A given LiDAR sensor may capture sensor data including one or more raw pointclouds (illustrated and labeled as "Lidar Detection 310" in FIG. 3) and/or one or more ghost raw pointclouds (illustrated and labeled as "Ghost Lidar Detection 315" in FIG. 3). A given camera sensor may capture image data including one or more camera detections 320 and/or one or more ghost camera detections 325. In these and other embodiments, ghost raw pointclouds and/or ghost camera detections (collectively referred to as "ghost objects" herein) may refer to an out-of-focus, blurry, or otherwise false and/or unclear representation of an object included in the sensor data.

As illustrated in a first example 330, four LiDAR objects 331-334 and one ghost LiDAR object 335 may be detected corresponding to the raw pointclouds captured by the given LiDAR sensor, and three image objects 336-338 may be detected corresponding to the image data captured by the given camera sensor. Three of the LiDAR objects 331, 333, and 334 may be identified as matching objects that correspond to the image objects 336, 337, and 338, respectively, as described above in relation to the operations of the local tracking module 230 and/or the Hungarian matching algorithm 240 of FIG. 2. As such, the three matched objects identified in the first example may be categorized as matched objects that are part of the persistent track. Additionally or alternatively, the second LiDAR object 332 may be categorized as a new track as the LiDAR object 332 may be considered reliable in the context of the first example 330. Additionally or alternatively, the ghost LiDAR object 335 may be discarded or treated as a lost track.

In a second example 340 and a third example 350, the given LiDAR sensor and the given image-capturing sensor detect the same objects 331-334 and 336-338 and the ghost LiDAR object 335 as in the first example 330. However, the initial-matching process may determine that a first object detected by the given camera sensor corresponds to a different second object detected by the given LiDAR sensor (e.g., LiDAR object 332 corresponding to image object 336 in the second example 340, LiDAR object 333 corresponding to image object 338 in the third example 350, and LiDAR object 334 corresponding to image object 337 in the third example 350). In a fourth example 360, a fifth example 370, and a sixth example 380, the initial-matching process may identify object matches including ghost objects (e.g., the ghost objects 335 and 339 in the fourth example 360 and image object 338 corresponding to the ghost image object 339 in the fifth example 370 and the sixth example 380). In these and other examples, the mismatched objects and/or the objects matched with ghost objects (e.g., the LiDAR object 332 and the image object 336 in the second example 340, the LiDAR object 333 and the image object 338 and the LiDAR object 334 and the image object 337 in the third example 350, the LiDAR object 335 and the image object 339 in the fourth example 360, and/or the LiDAR object 333 and the image object 337 and the LiDAR object 334 and the image object 339 in the fifth example 370 and/or the sixth example 380) may be categorized as part of the new track, and further processing of the sensor data associated with the new-track objects during the late-fusion process may resolve data discrepancies.

As illustrated in a seventh example 390, the given camera sensor may detect two objects (image objects 336 and 337), and the given LiDAR sensor may detect two objects (LiDAR objects 333 and 334) that are different from the objects detected by the given camera sensor. In some embodiments, the objects detected by the given camera sensor and/or the objects detected by the given LiDAR sensor may be categorized as part of the lost track. Additionally or alternatively, the given camera sensor and/or the given LiDAR sensor may be identified as providing more reliable sensor data, and the objects detected by the sensor providing reliable sensor data may be categorized as part of the new track. For example, if the LiDAR sensor system is identified as being more reliable, the image objects 336 and 337 may be categorized as part of the lost track, while the LiDAR objects 333 and 334 may be categorized as part of the new track.

Modifications, additions, or omissions may be made to the object-matching system 300 without departing from the scope of the present disclosure. For example, the designations of different elements in the manner described is meant to help explain concepts described herein and is not limiting. For instance, in some embodiments, the LiDAR objects 331-334, the image objects 336-338, and/or the ghost objects 335 and 339 are delineated in the specific manner described to help with explaining concepts described herein but such delineation is not meant to be limiting. Further, the object-matching system 300 may include any number of other elements or may be implemented within other systems or contexts than those described.

Figure 4:
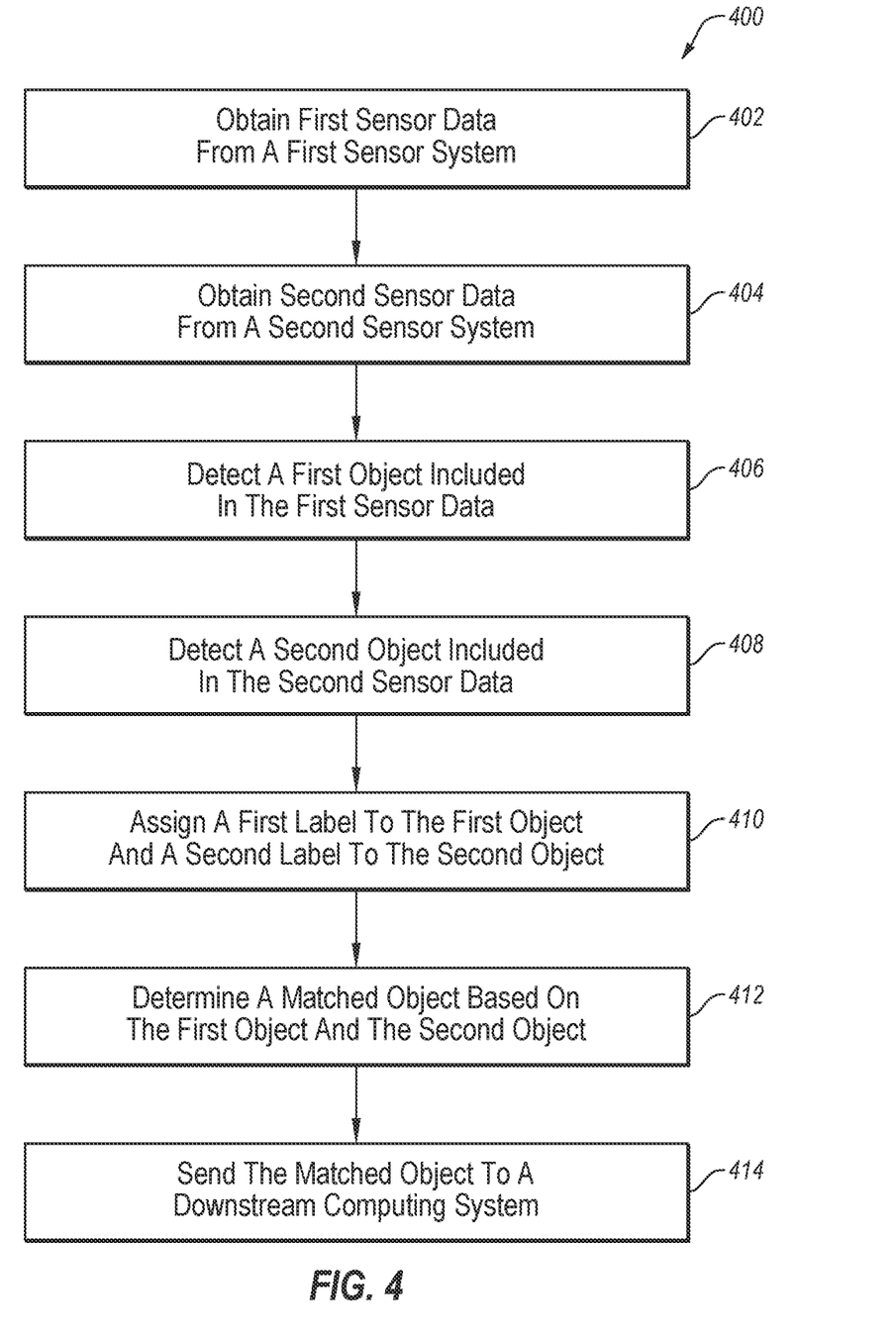
FIG. 4 is a flowchart of an example method of performing object matching according to at least one embodiment of the present disclosure.

FIG. 4 is a flowchart of an example method 400 of performing object matching according to at least one embodiment of the present disclosure. The method 400 may be performed by any suitable system, apparatus, or device. For example, the object-matching system 200 of FIG. 2 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where first sensor data captured by a first sensor system may be obtained.

At block 404, second sensor data captured by a second sensor system of a different type from the first sensor system may be obtained. For example, the first sensor system may be a LiDAR sensor system, and the second sensor system may be a camera sensor system, a radar sensor system, or any other sensor system that is configured to capture sensor data relating to a total measurable world around an autonomous vehicle.

At block 406, a first object included in the first sensor data may be detected.

At block 408, a second object included in the second sensor data may be detected. In some embodiments, detecting the first object and/or the second object may involve using a machine learning engine trained to detect one or more objects included in the sensor data via a R-CNN or other CNN process as described in relation to the detection and segmentation module 220 of the object-matching system 200. Additionally or alternatively, detection of objects included in two-dimensional image data may be facilitated by the three-dimensional bounding box regression module 225 of the object-matching system 200 or any other image analysis processes.

At block 410, a first label may be assigned to the first object and a second label may be assigned to the second object based on a comparison between the first sensor data and the second sensor data. The first label and the second label may indicate a degree to which the first object and the second object match one another. In some embodiments, a Hungarian matching algorithm, such as the Hungarian matching algorithm 240 of the object-matching system 200, may be applied to the first object included in the first sensor data and the second object included in the second sensor data to indicate the degree to which the first object and the second object match. Based on the results of the Hungarian matching algorithm the first object and the second object may be categorized as a persistent track 242, a new track 244, and/or a lost track 246 as described in relation to the object-matching system 200 and/or the object-matching process 300.

At block 412, a matched object may be determined responsive to the first and second labels indicating that the first object and the second object match. In some embodiments, whether the first and the second labels indicate that the first object and the second object match may be determined using a Kalman filtering process to match one or more motion parameters associated with the first object and the second object and determine one or more matched motion parameters associated with the matched object. Additionally or alternatively, determining the matched object based on the first object and the second object may include using a probabilistic shape fusion process, a statistical-methodbased fusion process, or a statistical-method-based existence fusion process to match an identity of the first object to an identity of the second object.

At block 414, the matched object may be sent to one or more downstream computing systems of an autonomous vehicle. For example, the matched object may be sent to the mapping system 104, the localization system 106, the routing system 108, the prediction system 110, the decision system 112, the planning system 114, the control system 116, the drive-by-wire system 118, the visualization system 120, the diagnostics system 122, and/or the simulations system 124 of the autonomous-driving system 100 as described in relation to FIG. 1. Additionally or alternatively, the matched object may be fed back to improve the accuracy and/or consistently of object detection at blocks 406 and 408 and/or matching a the block 412.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
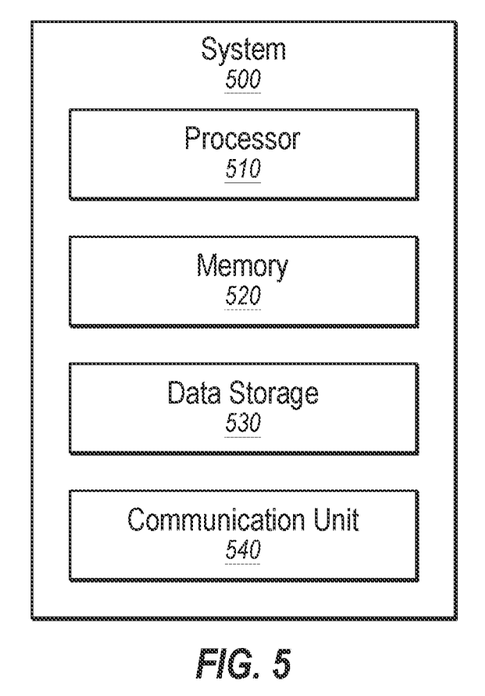
FIG. 5 is an example computing system.

FIG. 5 illustrates an example computing system 500, according to at least one embodiment described in the present disclosure. The computing system 500 may include a processor 510, a memory 520, a data storage 530, and/or a communication unit 540, which all may be communicatively coupled. Any or all of the object-matching system 200 of FIG. 2 may be implemented as a computing system consistent with the computing system 500, including the determination of parameters associated with the detected objects, the initial-matching process and/or the late-fusion process.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform operations associated with the method 400 of FIG. 4 including obtaining first sensor data from a first sensor system, obtaining second sensor data from a second sensor system different from the first sensor system, detecting a first object included in the first sensor data, detecting a second object included in the second sensor data, assigning a first label to the first object and a second label to the second object, determining a matched object responsive to the first and second labels indicating that the first object and the second object match, and/or sending the matched object to a downstream computing system associated with an autonomous vehicle.

The memory 520 and the data storage 530 may include computer-readable storage media or one or more computer-readable storage mediums for having computer-executable instructions or data structures stored thereon. Such computer-readable storage media may be any available media that may be accessed by a general-purpose or special-purpose computer, such as the processor 510. For example, the memory 520 and/or the data storage 530 may store obtained sensor data obtained from the LiDAR sensors 210, the camera sensors 212, and/or the radar sensors 214 and/or objects categorized as part of the persistent tracks 242, the new tracks 244, and/or the updated tracks 246 as described in relation to the object-matching system 200 of FIG. 2. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining first sensor data captured by a first sensor system;
obtaining second sensor data captured by a second sensor system of a different type from the first sensor system;
detecting a first object included in the first sensor data;
detecting a second object included in the second sensor data;
assigning a first label to the first object, and a second label to the second object, the first label and the second label being based on a comparison between the first sensor data and the second sensor data in which the first and the second labels indicate a degree to which the first object and the second object match;
responsive to the first and second labels indicating that the first object and the second object match, designating a matched object that is representative of both the first object and the second object;
sending the matched object to one or more downstream computing systems of an autonomous vehicle;
obtaining third sensor data that includes a third object, the third object not matching the first object or the second object;
applying a Kalman filtering process to the third sensor data, the Kalman filtering process including matching a third motion parameter associated with the third object to one or more first motion parameters associated with the first object or one or more second motion parameters associated with the second object; and
determining that the third object matches the first object or the second object based on the matching of the third motion parameter to the first motion parameters or the second motion parameters.

2. The method of claim 1, wherein the first sensor system is a Light Detection and Ranging (LiDAR) sensor system.

3. The method of claim 1, wherein the second sensor system is a camera sensor system or a radar sensor system.

4. The method of claim 1, wherein detecting the first object included in the first sensor data and detecting the second object included in the second sensor data includes applying a region-based convolutional neural network to the first sensor data and the second sensor data.

5. The method of claim 1, wherein comparing the first sensor data and the second sensor data to indicate the degree to which the first object and the second object match includes applying a Hungarian matching algorithm to the first sensor data corresponding to the first object and the second sensor data corresponding to the second object.

6. The method of claim 1, wherein determining the matched object based on the first object and the second object includes using a probabilistic shape fusion process, a statistical-method-based fusion process, or a statistical-method-based existence fusion process to match an identity of the first object to an identity of the second object.

7. One or more non-transitory computer-readable storage media configured to store instructions that, in response to being executed, cause a system to perform operations, the operations comprising:
obtaining first sensor data captured by a first sensor system;
obtaining second sensor data captured by a second sensor system of a different type from the first sensor system;
detecting a first object included in the first sensor data;
detecting a second object included in the second sensor data;
assigning a first label to the first object, and a second label to the second object, the first label and the second label being based on a comparison between the first sensor data and the second sensor data in which the first and the second labels indicate a degree to which the first object and the second object match;
responsive to the first and second labels indicating that the first object and the second object match, designating a matched object that is representative of both the first object and the second object;
sending the matched object to one or more downstream computing systems of an autonomous vehicle;

obtaining third sensor data that includes a third object, the third object not matching the first object or the second object;

applying a Kalman filtering process to the third sensor data, the Kalman filtering process including matching a third motion parameter associated with the third object to one or more first motion parameters associated with the first object or one or more second motion parameters associated with the second object; and determining that the third object matches the first object or the second object based on the matching of the third motion parameter to the first motion parameters or the second motion parameters.

8. The one or more non-transitory computer-readable storage media of claim 7, wherein the first sensor system is a Light Detection and Ranging (LiDAR) sensor system.

9. The one or more non-transitory computer-readable storage media of claim 7, wherein the second sensor system is a camera sensor system or a radar sensor system.

10. The one or more non-transitory computer-readable storage media of claim 7, wherein detecting the first object included in the first sensor data and detecting the second object included in the second sensor data includes applying a region-based convolutional neural network to the first sensor data and the second sensor data.

11. The one or more non-transitory computer-readable storage media of claim 7, wherein comparing the first sensor data and the second sensor data to indicate the degree to which the first object and the second object match includes applying a Hungarian matching algorithm to the first sensor data corresponding to the first object and the second sensor data corresponding to the second object.

12. The one or more non-transitory computer-readable storage media of claim 7, wherein determining the matched object based on the first object and the second object includes using a probabilistic shape fusion process, a statistical-method-based fusion process, or a statistical-method-based existence fusion process to match an identity of the first object to an identity of the second object.

13. A system comprising:
one or more processors; and
one or more non-transitory computer-readable storage media configured to store instructions that, in response to being executed, cause a system to perform operations, the operations comprising:
obtaining first sensor data captured by a first sensor system;
obtaining second sensor data captured by a second sensor system of a different type from the first sensor system;
detecting a first object included in the first sensor data;
detecting a second object included in the second sensor data;
assigning a first label to the first object, and a second label to the second object, the first label and the second label being based on a comparison between the first sensor data and the second sensor data in which the first and the second labels indicate a degree to which the first object and the second object match;
responsive to the first and second labels indicating that the first object and the second object match, designating a matched object that is representative of both the first object and the second object;
sending the matched object to one or more downstream computing systems of an autonomous vehicle;
obtaining third sensor data that includes a third object, the third object not matching the first object or the second object;
applying a Kalman filtering process to the third sensor data, the Kalman filtering process including matching a third motion parameter associated with the third object to one or more first motion parameters associated with the first object or one or more second motion parameters associated with the second object; and
determining that the third object matches the first object or the second object based on the matching of the third motion parameter to the first motion parameters or the second motion parameters.

14. The system of claim 13, wherein the first sensor system is a Light Detection and Ranging (LiDAR) sensor system and the second sensor system is a camera sensor system or a radar sensor system.

15. The system of claim 13, wherein detecting the first object included in the first sensor data and detecting the second object included in the second sensor data includes applying a region-based convolutional neural network to the first sensor data and the second sensor data.

16. The system of claim 13, wherein comparing the first sensor data and the second sensor data to indicate the degree to which the first object and the second object match includes applying a Hungarian matching algorithm to the first sensor data corresponding to the first object and the second sensor data corresponding to the second object.

17. The system of claim 13, wherein determining the matched object based on the first object and the second object includes using a probabilistic shape fusion process, a statistical-method-based fusion process, or a statistical-method-based existence fusion process to match an identity of the first object to an identity of the second object.

* * * * *